(12) United States Patent  
Zylla

(10) Patent No.: US 8,784,670 B2  
(45) Date of Patent: Jul. 22, 2014

(54) MULTI-PHASE FLOW SEPARATION APPARATUS AND SYSTEM

(75) Inventor: Ronald William Zylla, Grande Prairie (CA)

(73) Assignee: Rheaume Engineering Inc., Grande Prairie, Alberta (CA)

( * ) Notice: Subject to any disclaimer, the term of this patent is extended or adjusted under 35 U.S.C. 154(b) by 287 days.

(21) Appl. No.: 13/224,455

(22) Filed: Sep. 2, 2011

(65) Prior Publication Data

US 2013/0056427 A1    Mar. 7, 2013

(51) Int. Cl.
*B01D 21/24* (2006.01)
*B01D 49/00* (2006.01)
*E21B 43/34* (2006.01)

(52) U.S. Cl.
CPC ........ *B01D 21/2416* (2013.01); *B01D 21/2494* (2013.01); *B01D 49/003* (2013.01); *B01D 2221/04* (2013.01); *E21B 43/34* (2013.01)
USPC ........ 210/801; 210/519; 210/532.1; 210/539; 210/540; 95/253; 96/182; 166/267; 166/75.12

(58) Field of Classification Search
USPC ............. 210/800, 801, 519, 532.1, 538, 539, 210/540; 95/253; 96/182, 183, 184; 166/267, 75.12
See application file for complete search history.

(56) References Cited

U.S. PATENT DOCUMENTS

| | | | | |
|---|---|---|---|---|
| 1,741,187 A * | 12/1929 | Fuqua | ............................ | 210/519 |
| 2,355,305 A * | 8/1944 | Koenig | .......................... | 210/519 |
| 2,706,531 A * | 4/1955 | Lovelady et al. | ................ | 96/184 |
| 3,273,318 A | 9/1966 | Meyer | | |
| 3,814,262 A * | 6/1974 | Nolley, Jr. | ...................... | 210/519 |
| 4,073,734 A | 2/1978 | Lowrie | | |
| 4,116,647 A | 9/1978 | Garner | | |
| 5,204,000 A * | 4/1993 | Steadman et al. | ............. | 210/519 |
| 5,486,153 A | 1/1996 | Gingras | | |
| 5,837,152 A * | 11/1998 | Komistek et al. | .............. | 210/801 |
| 5,865,992 A | 2/1999 | Edmondson | | |
| 6,099,742 A * | 8/2000 | Komistek | ........................ | 210/519 |
| 6,099,743 A | 8/2000 | Pedersen | | |
| 6,214,092 B1 | 4/2001 | Odom et al. | | |
| 6,537,458 B1 | 3/2003 | Polderman | | |
| 6,709,500 B1 * | 3/2004 | West | ............................ | 210/532.1 |
| 7,278,543 B2 * | 10/2007 | Sagatun et al. | .................. | 96/184 |
| 7,383,958 B2 | 6/2008 | Hemstock et al. | | |
| 7,785,400 B1 | 8/2010 | Worley et al. | | |
| 8,308,959 B2 * | 11/2012 | Noles, Jr. | ........................ | 210/519 |
| 2002/0162806 A1 * | 11/2002 | Komistek | ........................ | 210/519 |
| 2011/0266228 A1 * | 11/2011 | Brown et al. | .................. | 210/519 |

* cited by examiner

*Primary Examiner* — Christopher Upton
(74) *Attorney, Agent, or Firm* — Davis & Bujold, PLLC; Michael J. Bujold

(57) ABSTRACT

A multi-phase flow separation apparatus has a tank with at least one inlet and at least one outlet, and an enclosure within the tank. The at least one inlet communicates an input flow into the enclosure. The enclosure has a sidewall defining an open bottom and at least one flow opening below the height of the inlet of the tank. The at least one outlet of the tank is outside the enclosure and above the at least one flow opening of the enclosure.

37 Claims, 6 Drawing Sheets

Section A-A

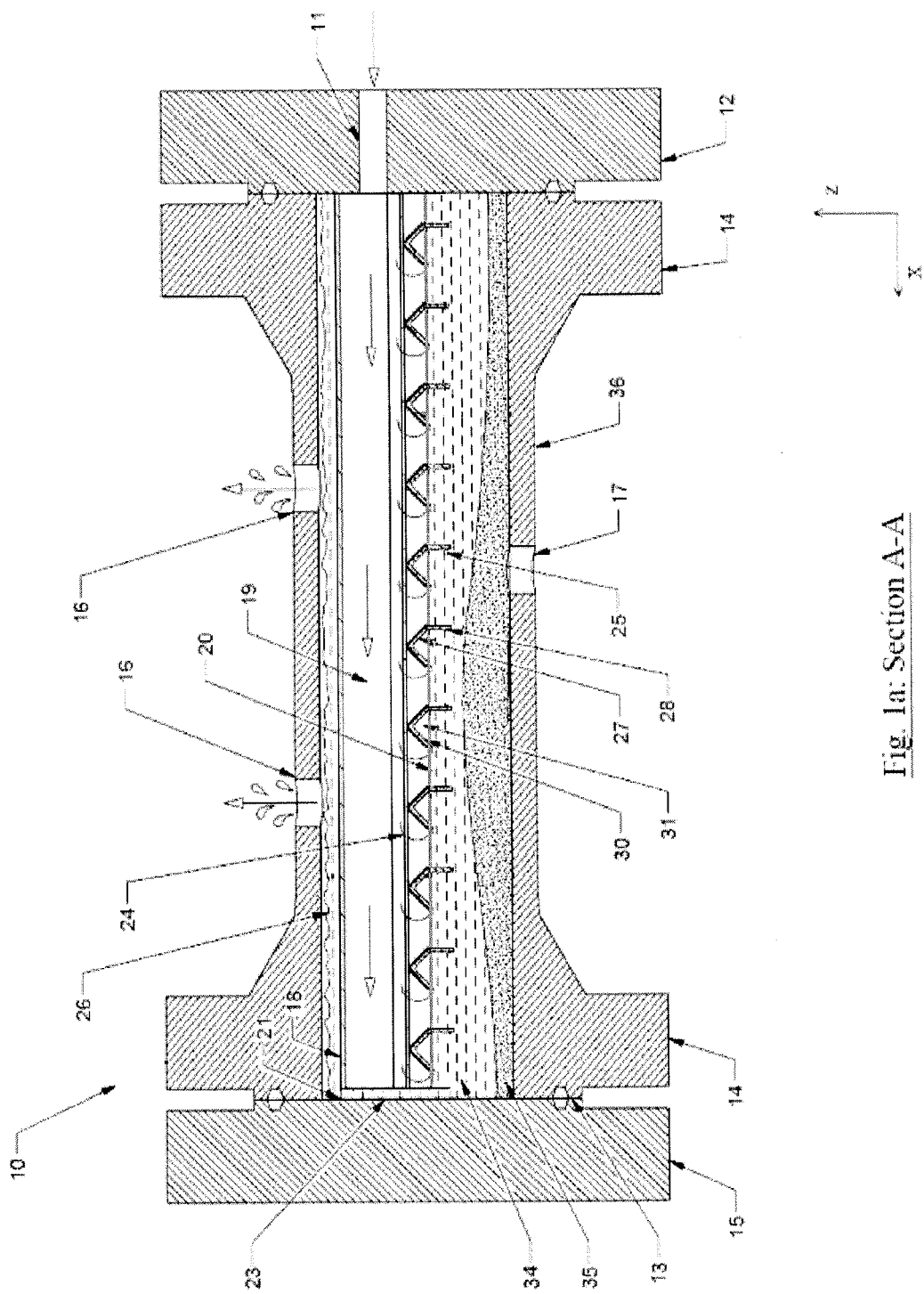
Fig. 1a: Section A-A

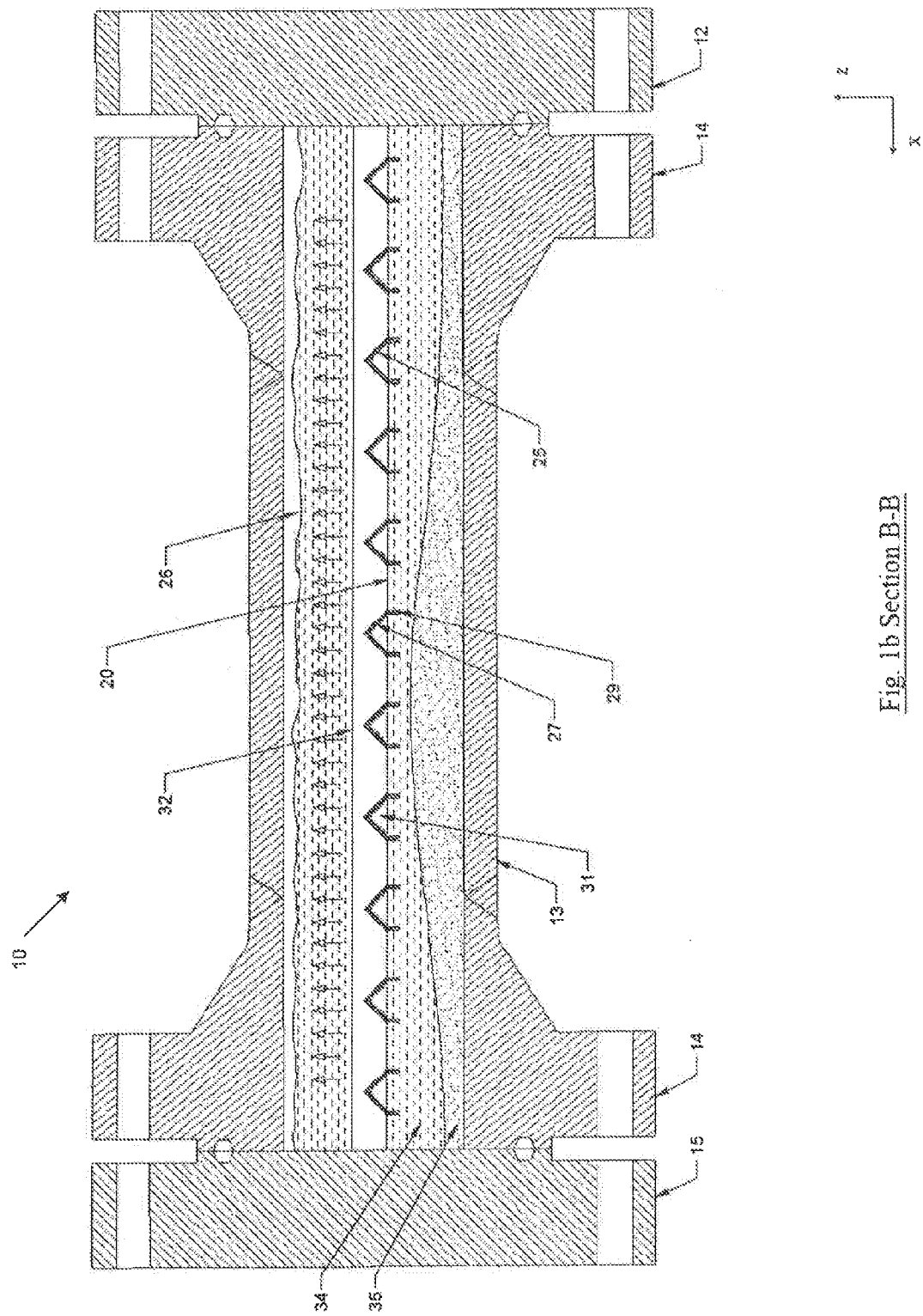
Fig. 1b Section B-B

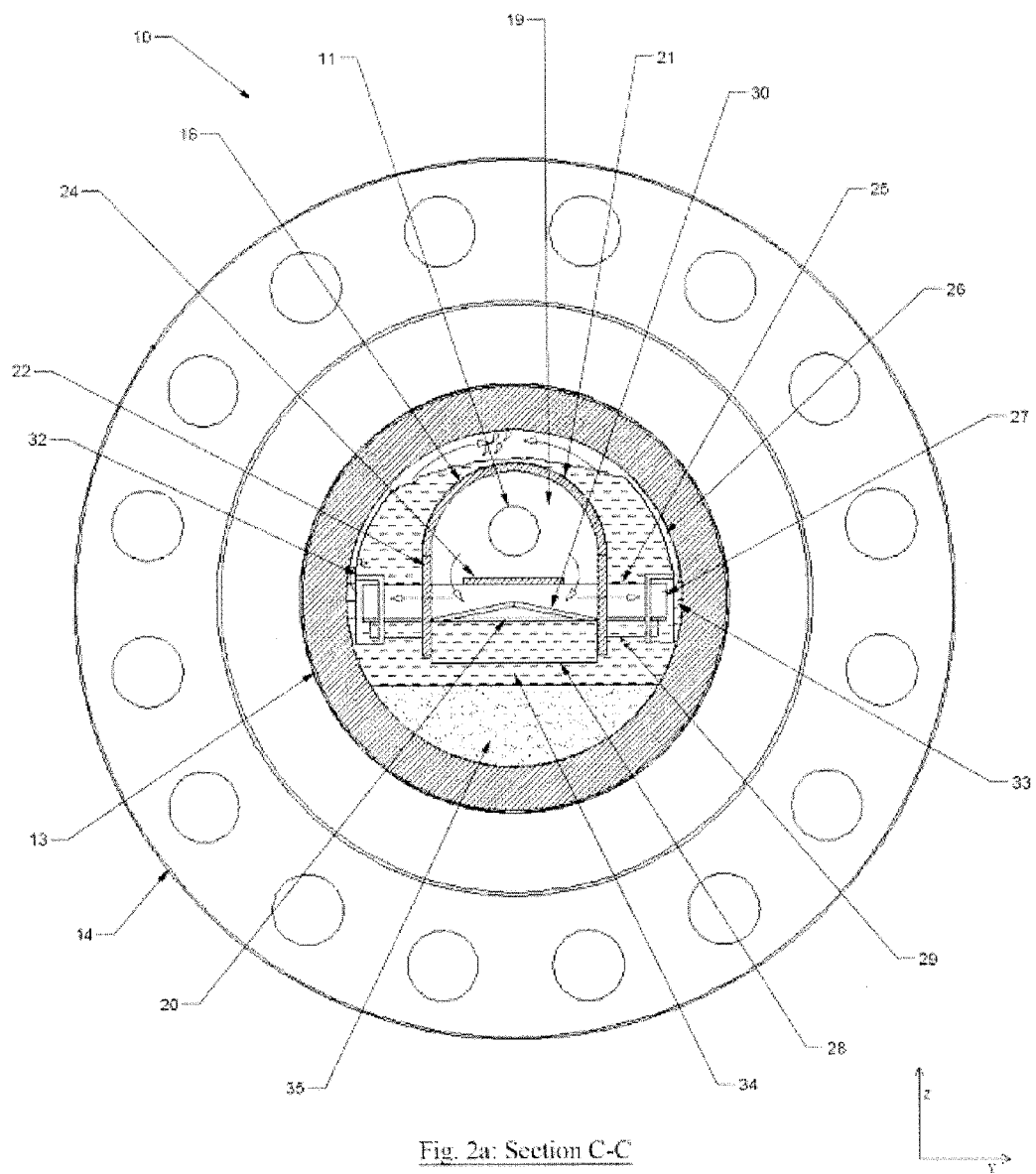
Fig. 2a: Section C-C

MULTI-PHASE FLOW SEPARATION APPARATUS AND SYSTEM

FIELD

This relates to an apparatus and system for separating entrained solids from a multiphase fluid flow.

BACKGROUND

There are many situations where particulates are entrained in a liquid. One example includes production fluid from wells in the oil and gas industry, which often contain particulates such as sand. These particulates could be part of the formation from which the hydrocarbon is being produced, introduced particulates from hydraulic fracturing or fluid loss material from drilling mud or fracturing fluids or from a phase change of produced hydrocarbons caused by changing conditions at the wellbore (asphalt or wax formation). As the particulates are produced, problems occur due to abrasion, and plugging of production equipment. In a typical startup after stimulating a well by fracturing, the stimulated well may produce sand until the well has stabilized, often for a month or up to many months after production commences. Other wells may also require extended use of a desander.

In the case of gas wells, fluid velocities can be sufficiently high that the erosion of the production equipment can result in catastrophic failure. High fluid stream velocities are typical and are even purposefully designed for elutriating particles up the well and to the surface. An erosive failure of this nature can become a serious safety and environmental issue for the well operator. A failure such as a breach of high pressure piping or equipment releases uncontrolled high velocity flow of fluid which is hazardous to personnel and equipment. Release to the environment is damaging to the environment resulting in expensive cleanup and loss of production. Repair costs are also high.

In all cases, retention of particulates contaminates both surface equipment and the produced fluids and impairs the normal operation of the oil and gas gathering systems and process facilities.

One prior art system that attempts to separate solid particulates from a multi-phase flow can be found in U.S. Pat. No. 7,383,958 (Hemstock et al.) entitled "Desanding apparatus and system". This design uses a weir plate within a vessel to direct the flow downward and maintain a gaseous volume above.

SUMMARY

According to an aspect, there is provided a multi-phase flow separation apparatus, comprising a tank having at least one inlet and at least one outlet, and an enclosure within the tank. The at least one inlet communicates an input flow into the enclosure. The enclosure has a sidewall defining an open bottom and at least one flow opening below the height of the inlet of the tank. The at least one outlet of the tank is outside the enclosure and above the at least one flow opening of the enclosure.

According to another aspect, the enclosure extends along a length of the tank.

According to another aspect, the at least one flow opening comprises one or more bottom edges of the sidewall.

According to another aspect, the at least one flow opening comprises discrete openings spaced along a length of at least one side of the enclosure.

According to another aspect, the at least one flow opening comprises multiple channels having at least one channel inlet within the enclosure and at least one channel outlet outside the enclosure.

According to another aspect, the at least one channel outlets connect to a common diffusion body outside the enclosure. The channels may have an open bottom. The separation apparatus may further comprise a distribution member positioned above the channels in the enclosure. The channels may be at an angle to a length of the enclosure. The inlet of the tank may be positioned at a first end of the length of the enclosure and the channel openings may be on a side of the channel opposite the inlet of the tank. The sidewall of the enclosure may extend below the discrete openings. The tank may be filled with liquid to a level above the at least one flow opening such that the enclosure and the channels each form a vapor lock.

According to another aspect, the tank comprises a horizontal cylindrical body, and the enclosure extends along a length of the cylindrical body.

According to another aspect, the enclosure is an inverted U-shape.

According to another aspect, the enclosure is spaced from an inner surface of the tank. The outlets are preferably positioned above the enclosure.

According to another aspect, the tank defines a flow path from the inlet to the outlet having three mutually orthogonal directions.

According to another aspect, the enclosure has an axis that is parallel to the input flow.

According to another aspect, the tank is filled with liquid to a level above the at least one flow opening such that the enclosure forms a vapor lock.

According to another aspect, there is provided a method of separating solids from a multi-phase flow, comprising the steps of: providing a separator vessel as described above; defining a flow path from the inlet to the outlet by providing the enclosure with a sidewall defining at least one opening toward the bottom of the enclosure, the flow path defining three mutually orthogonal components; and injecting a multi-phase flow through the inlet of the tank.

According to another aspect, there is provided a multi-phase separation apparatus that uses three-dimensional flow dispersion to separate a solid phase out of a multi-phase stream. The apparatus is comprised of a vessel and an internal assembly with primary and secondary enclosures and diffusers. The primary and secondary enclosures form a vapor lock with contained liquids within the vessel and direct all fluid flow through said liquid. The primary enclosure runs the full length of the vessel to direct the fluid flow in an expanded area to reduce the fluid flow velocity. The gases are directed through a labyrinthine path in the primary and secondary enclosures. Solid particulates within the multi-phase stream are separated by gravity, momentum, and elutriation means within the apparatus. The solid particulates accumulate in the bottom portion of the apparatus vessel and are removed through the clean-out end of the vessel.

According to another aspect, the separation apparatus is placed upstream of the processes for which the solid particulates are to be removed. The multiphase fluid flow enters the separation apparatus at one end of the apparatus vessel. The multiphase fluid flow immediately undergoes an expansion within the vessel in a gaseous phase volume known as the permanent vapor lock (PVL), which decelerates the fluid flow. The multiphase fluid flow continues along the length of the PVL, with a downwards velocity gradient, allowing the solid particulates to separate from the majority of the flow by being pulled out of the stream by gravity. A runner runs the length of the PVL, which encourages the liquid and solid phases to distribute evenly along the length of the vessel. The PVL creates a positive pressure vapor lock as liquid volumes from the fluid stream accumulate in the lower volume of the apparatus vessel and create a seal with the bottom edges of the PVL enclosure. Gaseous fluid flows from the stream, after expansion within the PVL, then are directed into volumes created by channels referred to as the dynamic vapor locks (DVLs). These vapor locks are referred to as "dynamic" as they will fill with liquid when fluid flow ceases. This may be contrasted with the PVL, which will remain filled with vapor. The DVLs run perpendicular to the PVL and have a notched face creating a vapor diffusion edge (VDE). For the vapor flow to enter the DVL around the VDE it must negotiate a 180 degree turn in its flow direction (vessel axial). The direction change causes the solids to separate from the gaseous flow as the higher momentum of the solid particulates can not remain entrained in the vapor flow. The DVLs then create a 90 degree turn for the vapor flow further removing solid particulates. The vapor passes through the DVLs into channels known as vapor dispersion bars (VDBs). The VDBs cause another 90 degree turn for the vapor flow, again further removing solid particulates. From this point the vapor bubbles out of the top edge of the VDBs through the vapor lock. Liquid phase fluids flow out from the PVL and under the vapor lock. The liquid flows into the annular space created between the PVL and the apparatus vessel. At this point it meets with the vapor phase and the two phases flow upwards through the annular space towards the outlets on the top of the vessel. The fluid velocity within the annular space is designed to be less than the elutriation velocity of the design case of solid particulates being encapsulated. As the elutriation velocity of the solid particulates is greater than the fluid velocity the solid particulates drop out of the stream and accumulate in the bottom of the vessel. The separation apparatus includes a series of outlets on the top to distribute the fluid flow evenly along the entire vessel length, thereby increasing the efficiency of the entire separation process.

According to another aspect, the separation apparatus does not use a filter medium to strain solid particulates from the fluids stream. Instead, the vapor lock created between the accumulation of produced liquids and the PVL causes the entire production stream to pass through this barrier. This barrier, the vapor lock surface, becomes the cross-sectional area that all flow passes, which is many times larger than the inlet's flow area and also the flow area of prior art (e.g. Hemlock et al). The large flow area of the vapor lock greatly reduces the velocity of the flow whereby the solid particulates easily separate from. Additionally, the gas-liquid interface of the vapor lock effectively separates solid particulates from the gas stream as the difference in densities between the solids and the gases is greater than that between the solids and the liquids. Further, the gas stream is subjected to multiple, such as four, 90 degree turns whereby the solid particulates momentum carries them outside of the gas stream.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1a is a cross-sectional longitudinal view of the separation apparatus along its centerline.
FIG. 1b is a cross-sectional longitudinal view of the separation apparatus, offset from the centerline, showing the DVL and VDB areas.
FIG. 2a is a cross-sectional axial view of the separation apparatus with hidden lines, which gives a perpendicular view of the PVL and inlet areas.

DETAILED DESCRIPTION

A preferred embodiment will now be described with respect to FIG. 1, 1a, 1b, 2 and 2a. It will be understood that modifications of this design may also be used. Some examples of modifications will be discussed in the description of the preferred embodiment, some will be described as alternatives, and others will be apparent to those skilled in the art once the principles of operation are understood.

Figure 1:
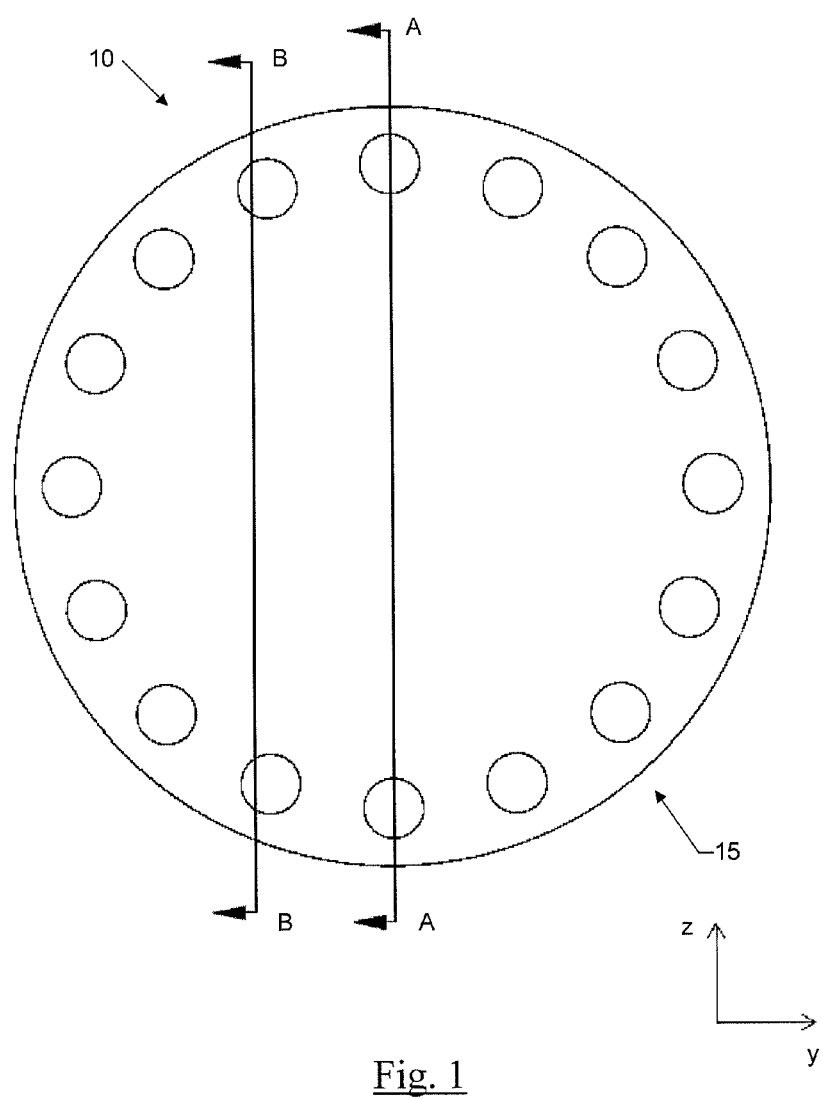
FIG. 1 is an axial elevation view of separation apparatus.
Figure 2:
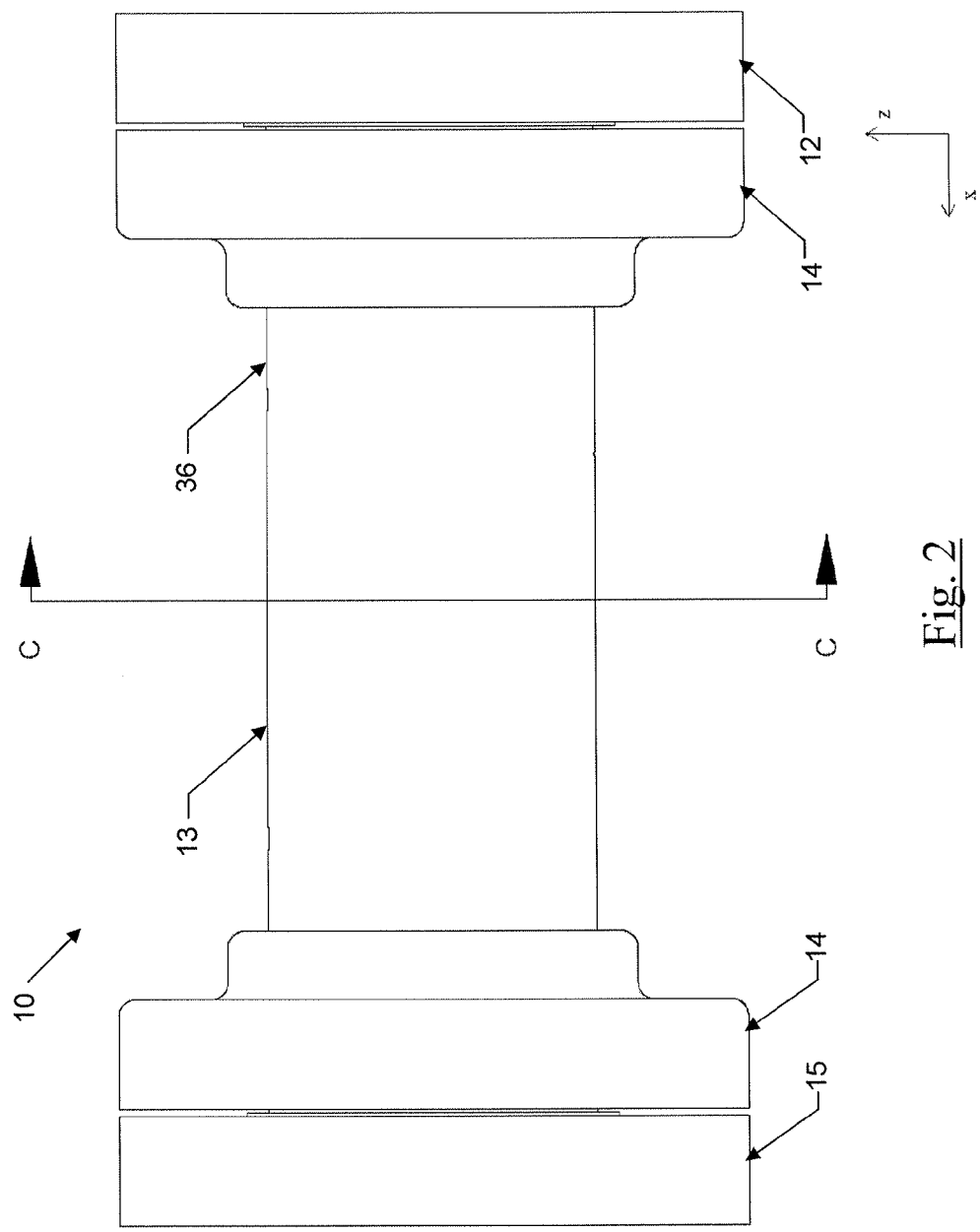
FIG. 2 is a longitudinal elevation view of the separation apparatus.

Referring to FIG. 2, the separation apparatus 10 is preferably constructed using a cylindrical-type pressure vessel as is common in many separation processes, as is depicted and described below. However, it will be understood that other shapes and sizes may also be used. For example, there may be certain advantages to using a spherical-type vessel.

The main body of the vessel 36 preferably has a pipe body 13 with a pipe flange 14 on each end, which the inlet flange 12 and end flange 15 attached in order to seal apparatus 10. The end flange 15 can be a standard bolted blind flange common in industry or can be of the quick opening type. The end flange 15 may include fittings and valves for the monitoring of the separation process (not shown). Also, the end flange 15 may be used as an entrance into the separation apparatus 10 for the removal of accumulated solid particulates.

Referring to FIG. 1a, flow into the separation apparatus 10 is through the inlet 11, which is shown as being within the inlet flange 12. On the top of the pipe body 13 are a number of outlets 16. The number of outlets 16 could be one or more. More outlets are preferably as it would tend to distribute the outlet flow along the length of the separation apparatus 10. On the bottom of the pipe body 13 is a drain outlet 17. While only one drain is shown, there may be more if preferred or required. The drain outlet 17 allows the draining of accumulated solid particulates during clean-out operations. Other sparging apparatuses that are well known in the art may be adapted for continuous or batch clean-out. The depicted location of inlet 11 and outlets 16 and 17 were selected to optimize the manufacturing process and operability of the separation vessel based on the selected design. Once the principles described below are understood, it will be recognized that other locations for the various inlets and outlets may also be used that also satisfy the design and operability criteria discussed herein.

Figure 3B:
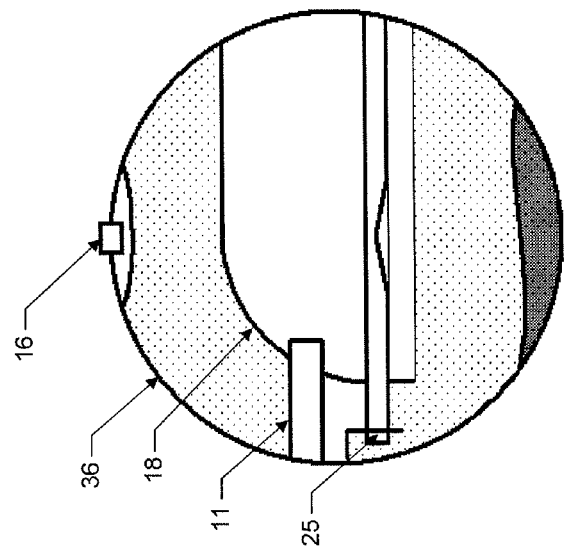
FIG. 3b is a side elevation view in section of a further alternative apparatus.
Figure 3A:
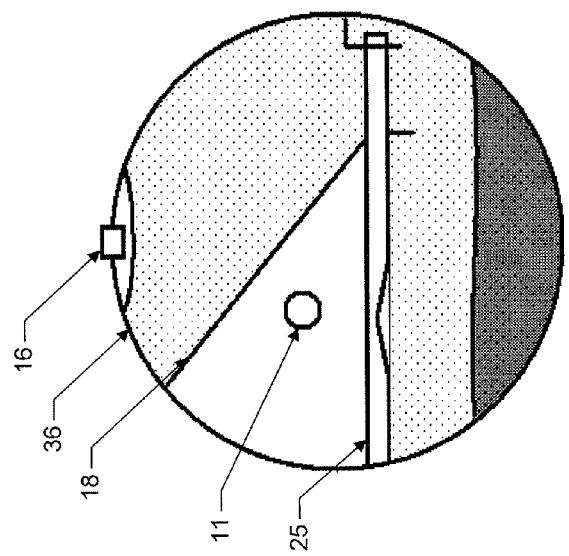
FIG. 3a is a cross-sectional view of an alternative apparatus.

Separation apparatus 10 is designed to receive multi-phase flow through the inlet 11 and into the permanent vapor lock (PVL) vapor space 19. Referring to FIG. 2a, the PVL vapor space 19, is defined by a sidewall 18, which may also be referred to as an enclosure, that defines an open bottom, and at least one flow opening that is located below the height of inlet 11. As the vapor lock is formed by the flow openings, this ensures that the inlet flow through inlet 11 is first received into the vapor lock area. As depicted, the flow openings are preferably part of smaller versions of a vapor lock, which are referred to herein as dynamic vapor locks (DVLs), indicated by reference numeral 25. As depicted, DVLs are channels with an open bottom and an opening within the PVL 18. This structure defines the vapor lock within PVL sidewall 18, and is generally referred to by reference numeral 20. It will be understood that the lower edge of the PVL enclosure 18 may also be used as the flow opening to define the vapor lock within PVL sidewall 18. The lower edge may be a straight edge, or a profiled edge to help direct the vapor flow at certain locations. It will also be understood that the flow opening may be only along one side of the PVL enclosure 18. For example, the PVL enclosure 18 may be made from a curved or straight baffle that extended outward from an inner surface of the pressure vessel 36 to form the enclosure 18 that defines the PVL vapor space 19, as shown in FIG. 3a. Alternatively, referring to FIG. 3b, pressure vessel 36 may be a spherical or round shape, and enclosure 18 may be a semi-spherical baffle within pressure vessel 36, or other suitable shape within vessel 36. It will also be understood that enclosure 18 may extend the entire length of vessel 36 as shown in FIG. 1b, or the end may be spaced from end flange 15 as shown in FIG. 1a.

As depicted in FIG. 2a, the PVL vapor space 19 is created by the vapor lock 20 defined by the openings in DVLs 25, and the interior surfaces of the PVL enclosure 18. As shown, the PVL enclosure 18 comprises a sheet of solid material formed into the PVL semicircle 21 and two PVL sides 22, which protrude down tangent to the PVL semicircle 21. Other suitable designs for the PVL enclosure 18 may also be used as will be recognized. Each end of the PVL enclosure 18 includes a PVL endcap 23, which seals to create the interior PVL vapor space 19. Endcap 23 may be part of the pipe body 13, or may be separate as shown in FIG. 1a, in which case there may be a space between endcap 23 and the inner surface of pipe body 13. Referring to FIG. 2a, there is preferably an annular space between the vessel 36 and the enclosure 18, which also allows both sides to be used as a vapor flow outlet.

As shown, the flow from inlet 11 is directed along a longitudinal axis of the PVL enclosure 18, which is also along the longitudinal axis of the pressure vessel 36. In addition to creating a larger area for the flow, it also helps reduce the amount of multiphase flow that impinges on any surfaces within the PVL enclosure 18 to reduce the amount of abrasive wear by placing the opposing surface at the other end of the pressure vessel 36.

Referring to FIGS. 1a and 1b, a cross-sectional area change occurs along the x-axis between the inlet 11 and the PVL vapor space 19. As the inlet flow is usually of high velocity, this area change causes expansion of the incoming flow and a responding decrease in velocity. The axial velocity of the flow continues to decrease along the length of the PVL enclosure 18 until it reaches zero at the PVL endcap 23.

A runner 24, which sits atop the dynamic vapor lock (DVL) assemblies 25, acts as a distribution member by directing solid and liquid phases of the flow along the length of the PVL enclosure 18. Within the PVL enclosure 18 and along its length solid particulates decelerate along the axial direction (x) and accelerate downwards in the vertical direction (z). Because of the sealed PVL vapor space 19, the liquid and solid phases are forced to make a 90 degree turn in the −z direction. The total flow area of the fluids is now the surface area of the vapor lock 20, which is many times greater than the cross-sectional flow area of the PVL vapor space 19, which further decelerates the flow. The solid and liquid phases now make a 90 degree turn in either the +y or −y direction before making another 90 degree turn upwards in the +z direction towards the vessel outlets 16. At this point the liquid phase and only the smallest solid particulates, such as colloidal particles, have gone through a deceleration and three 90 degree turns. Many of the solid particulates have now exited the main liquid phase stream, due in part to inertial differences in phases according to Sauders-Brown correlations or similar correlations, and have settled into a sedimentary layer 35 along the bottom of the pipe body 13. The liquid phase now travels upwards through the annular space 26 created between the PVL enclosure 18 and the pipe body 13 and any solid particulates are further separated by elutriation. The separation apparatus 10 can be custom designed to separate solid particulates of a specified diameter or greater. Given this design condition and using Stokes' Law, and or a similar correlation, the terminal velocity of the solid particulate can be found. Solid particulates with a terminal velocity greater than the liquid velocity in the annular space 26 fall out of the stream and settle on the sedimentary layer 35. The liquid flow in the annular space is distributed along the separation apparatus' 10 length through the use of two or more outlets 16.

As mentioned above, the flow opening is preferably a series of DVL assemblies 25, which lay perpendicular to the inlet flow and parallel to the y axis, and are spaced along the length of the PVL enclosure 18. Each DVL assembly 25 is depicted as having a DVL angle 27, a vapor diffusion edge (VDE) 30, a DVL inner skirt 28, and four DVL outer skirts 29. The spacing between each DVL assembly 25 along the x-axis, in one embodiment, is the same as the width of each DVL assembly 25 along the x-axis, but could be varied for optimization. The DVL assemblies 25 provide the path for the gas phase to follow. From the PVL vapor space 19 the gas flow decelerates along the x-axis and takes a 90 degree turn downwards in the −z direction. The DVL inner skirt 28 extends past the vapor lock 20 and restricts flow into the DVL vapor space 31 in the +x direction. Some of the gas flow will impinge on the vapor lock 20 whereby its entrained solid particulates will become encapsulated in the contained liquids 34. The gas flow itself must make another 90 degree turn in the −x direction past the VDE 30 to enter the DVL vapor space 31. The triangular shape of the VDE 30 is to direct more flow towards the center of the DVL assembly 25, causing the gas flow to travel a further linear distance and allow more time for solid particulates to settle. Once inside the DVL vapor space 31 the gas flow must make another 90 degree turn in either the +y or −y direction. The gas flow passes through the DVL vapor space 31 and into each vapor diffusion bar (VDB) 32, which acts as a diffuser to again allow expansion of the vapor and allow it to flow more uniformly toward the outlet. The VDB 32 may be close enough to the inner surface of the pressure vessel 36 to create a flow restriction, which also encourages a uniform flow. Upon entering the VDB 32 the gas flow will make a 90 degree turn in the +x or −x direction and then one more 90 degree turn up in the +z direction to pass through the space between the VDB 32 and the pipe body 13, through the annular vapor exit 33 (shown in FIG. 2a), and into the annular space 26. At this point the gas phase meets the liquid phase and they commingle as they travel towards the outlets 16 with the gas phase favoring to flow nearer the pipe body 13 inside wall due to its density difference compared with the liquid. The sequence of 90 degree turns and linear distance traveled by the gas phase causes solid particulates to settle in the bottom of the pipe body 13. The solid particulates have a much higher density than that of the gas flow and are not capable of remaining entrained within the gas flow as it follows the path of the DVL assemblies 25 and the VDB 32. As can be seen, apparatus 10 is design such that fluids entering through inlet 11 cannot escape enclosure 18 in any vertical plane that is parallel to the positive axial direction. In other words, the end of enclosure opposite inlet 11 is sealed, such that fluids must exit out the sides of enclosure 18.

It will be understood that the depiction of the various phases in the drawings are for illustration purposes only to help explain the relative travel of each phase, and that the actual operation of apparatus 10 is a dynamic process where the relative position of each phase will vary depending on many factors, including the composition of fluid entering apparatus 10.

When the separation apparatus 10 is first put into operation, and also after each time it is opened up for cleaning, there will be no liquids 34 contained to create a vapor lock 20 within the PVL enclosure 18. The separation apparatus 10 can be filled with liquid prior to being returned to service if there are not enough liquids 34 in the separation apparatus 10 to create the vapor lock 20. However, the separation apparatus 10 may also operate without creating a vapor lock by deflecting the inlet flow downward for the full length of the PVL enclosure 18, which reduces the exit velocity of the vapor by the ratio of the annular cross-sectional area at the level of the bottom of the PVL enclosure 18 to the inlet 11 cross-sectional area. The disadvantage of operating in this manner is that its overall volume is less than that of a typical common separator. In this case the gas flow will not only follow the direction as described above for gas flow, but also will follow the path described for what would be under normal operation the liquid flow.

Prior art that used gravity separation methods often need to be very large to effectively perform their duty, which can be prohibitively expensive. Prior art that used centrifugal separation methods are prone to high amounts of erosion as the fluid velocities within such a vessel are designed to be high. In contrast to this, the described separation apparatus decelerates the fluid velocities to a greater extent and utilizes the differential densities of the vapor lock, for separation of the solid particulates from the fluid stream over a greater range of process conditions—all of this in a more compact, cost effective package, which incurs lower levels of erosion because of lower stream velocities and impingement of solids on the liquid surface of the vapor lock.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:

1. A multi-phase flow separation apparatus, comprising:
   a tank having at least one inlet and at least one outlet; and
   an enclosure within the tank, the at least one inlet communicating an input flow into the enclosure, the enclosure having a sidewall defining an open bottom and at least one flow opening below the height of the inlet of the tank, the at least one outlet of the tank being outside the enclosure and above the at least one flow opening of the enclosure, wherein the tank has a liquid level that is above the at least one flow opening and the enclosure is filled with a gaseous phase such that the enclosure forms a vapor lock.

2. The separation apparatus of claim 1, wherein the enclosure extends along a length of the tank.

3. The separation apparatus of claim 1, wherein the at least one flow opening comprises one or more bottom edges of the sidewall.

4. The separation apparatus of claim 1, wherein the at least one flow opening comprises discrete openings spaced along a length of at least one side of the enclosure.

5. The separation apparatus of claim 4, wherein the at least one flow opening comprises multiple channels having at least one channel inlet within the enclosure and at least one channel outlet outside the enclosure.

6. The separation apparatus of claim 5, wherein the at least one channel outlets connect to a common diffusion body outside the enclosure.

7. The separation apparatus of claim 5, wherein the channels have an open bottom.

8. The separation apparatus of claim 5, further comprising a distribution member positioned above the channels in the enclosure.

9. The separation apparatus of claim 5, wherein the channels are at an angle to a length of the enclosure.

10. The separation apparatus of claim 9, wherein the inlet of the tank is positioned at a first end of the length of the enclosure and the channel openings are on a side of the channel opposite the inlet of the tank.

11. The separation apparatus of claim 5, wherein the enclosure and the channels each form a vapor lock.

12. The separation apparatus of claim 4, wherein the sidewall of the enclosure extends below the discrete openings.

13. The separation apparatus of claim 1, wherein the tank comprises a horizontal cylindrical body, the enclosure extending along a length of the cylindrical body.

14. The separation apparatus of claim 1, wherein the enclosure is an inverted U-shape.

15. The separation apparatus of claim 1, wherein the enclosure is spaced from an inner surface of the tank.

16. The separation apparatus of claim 15, wherein the outlets of the tank are positioned above the enclosure.

17. The separation apparatus of claim 1, wherein the tank defines a flow path from the inlet to the outlet having three mutually orthogonal directions.

18. The separation apparatus of claim 1, wherein the enclosure has an axis that is parallel to the input flow.

19. A method of separating solids from a multi-phase flow, comprising the steps of:
   providing a separator vessel comprising:
      a tank having at least one inlet and at least one outlet; and
      an enclosure within the tank, the enclosure defining an open bottom and at least one flow opening below the height of the inlet of the tank having an open bottom, the at least one outlet of the tank being outside the enclosure and above the at least one flow opening of the enclosure;
   defining a flow path from the inlet to the outlet by providing the enclosure with a sidewall defining at least one opening toward the bottom of the enclosure, the at least one inlet communicating an input flow into the enclosure, and the at least one outlet being above the opening of the enclosure and outside the enclosure, the flow path defining three mutually orthogonal components; and
   injecting a multi-phase flow through the inlet of the tank such that the tank has a liquid level that is above the at least one flow opening and the enclosure is tilled with a gaseous phase to form a vapor lock.

20. The method of claim 19, wherein the enclosure extends along a length of the tank.

21. The method of claim 19, the at least one flow opening comprises one or more bottom edges of the sidewall.

22. The method of claim 19, wherein the at east one flow opening comprises discrete openings spaced along a length of at least one side of the enclosure.

23. The method of claim 22, wherein the discrete openings comprise channels having at least one channel inlet within the enclosure and at least one channel outlet outside the enclosure.

24. The method of claim 23, wherein more than one channel outlets connect to a common diffusion body outside the enclosure.

25. The method of claim 23, wherein the channels have an open bottom.

26. The method of claim 23, further comprising a distribution member positioned above the channels in the enclosure.

27. The method of claim 23, wherein the channels are at an angle to a length of the enclosure.

28. The method of claim 27, wherein the at least one channel inlet is recessed from the bottom of the channel.

29. The method of claim 28, wherein the inlet of the tank is positioned at a first end of the length of the enclosure and the channel openings are on a side of the channel opposite the inlet of the tank.

30. The method of claim 23, wherein the sidewall of the enclosure extends below the discrete openings.

31. The method of claim 23, wherein the enclosure and the channels each form a vapor lock.

32. The method of claim 19, wherein the tank comprises a horizontal cylindrical body, the enclosure extending along a length of the cylindrical body.

33. The method of claim 19, wherein the enclosure is an inverted U-shape.

34. The method of claim 19, wherein the enclosure is spaced from an inner surface of the tank.

35. The method of claim 34, wherein the outlets are positioned above the enclosure.

36. The method of claim 19, wherein the tank defines a flow path from the inlet to the outlet having three mutually orthogonal directions.

37. The method of claim 19, wherein the enclosure has an axis that is parallel to the input flow.

* * * * *